Feb. 15, 1966 W. N. APPEL 3,235,807

NOISE ELIMINATOR

Filed Nov. 15, 1961

United States Patent Office 3,235,807

Patented Feb. 15, 1966

3,235,807
NOISE ELIMINATOR

William N. Appel, Wynnewood, Pa. (1600 Western Sav. Fund Bldg., Broad and Chestnut Sts., Philadelphia, Pa.)

Filed Nov. 15, 1961, Ser. No. 152,582
2 Claims. (Cl. 325—476)

Figure 1:
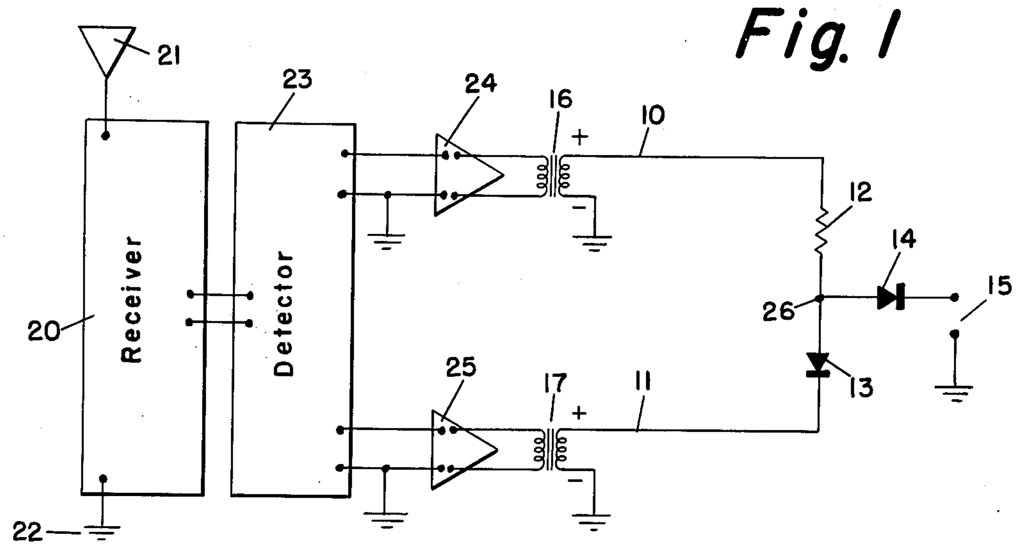

This invention relates to systems of minimizing the effects of noise on signals transmitted by way of transmission circuits and has for an object the provision of a system in which the effects of random noise can be attenuated at relatively low cost and with reasonably good efficiency.

Heretofore, those skilled in the art have recognized that noise, defined for the purposes of this description as any signal which undesirably changes the amplitude of the information-bearing signal whether due to static or other causes, can be minimized by the algebraic mixing of such signals. The difficulty with systems of this type, however, is that the only noise eliminated will be that which produces on the two signals amplitude changes of opposite polarity and in the same time coincidence. Unfortunately, noise does not appear in such idealized manner, since it may be random both in time occurrence and polarity.

In accordance with the present invention, the signal-to-noise ratio may be greatly improved even though initially less than unity.

It has further been proposed to utilize systems in which there is produced an inverted difference signal which is algebraically added to the initial signal to cancel out differences. The problem here is that a high degree of linearity is required over an extremely wide dynamic range, and thus the design considerations are greatly complicated.

In accordance with the present invention, two information-bearing signals, with the information contained thereon in time coincidence, are utilized. Noise will occur at random times and with random polarity. The effect of noise on the two signals is made to increase the amplitude thereof by reason of the fact that the two signals utilized are made of the same instantaneous polarity. Thus, noise present on either signal will have the effect of increasing its amplitude. The two signals are then so utilized that the information contained by them is reproduced only from the signal of lesser amplitude. It is in this manner that there are attenuated or greatly reduced the effects of noise, since that portion of the two signals reproduced is always the one having the instantaneously lesser amplitude. In a particular form of the invention, the foregoing steps are carried out by utilizing a resistor and a non-linear resistance element, as for example, a diode, in series circuit relation. The two signals are then applied, one to one side of the resistor and the other to one side of the non-linear resistance element. The two input signals have the same polarities relative to ground, and thus the junction between them, to which the output circuit including a diode is connected will have an amplitude dependent upon which of the two signals has the lesser amplitude. The end result is that there is applied to the output circuit including the diode only the signal of lesser amplitude which is the signal, instantaneously considered, having the least amount, if any, of noise.

For further objects and advantages of the invention and for a more detailed discussion of typical embodiments thereof, reference is to be had to the following description taken in conjunction with the accompanying drawings, in which:

FIG. 1 diagrammatically illustrates one embodiment of the invention; and

Figure 2:
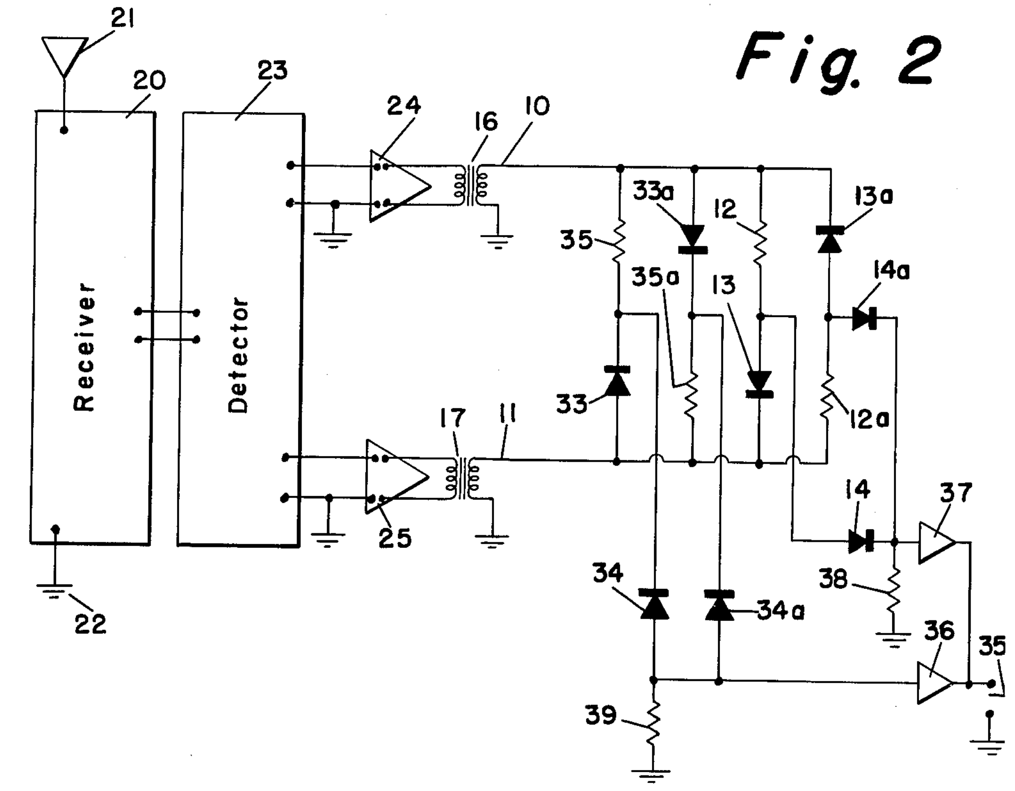

FIG. 2 is a wiring diagram of another embodiment of the invention of more general application.

Referring now to FIG. 1, the invention in one form has been shown as applied to two signal circuits 10 and 11, one of which is connected to one side of a resistor 12 and the other to one side of a diode 13, it being noted that the resistor 12 and the diode 13 are connected in series with their common junction having connected thereto an output circuit including an output diode 14 leading to output terminals 15.

For the moment, it may be assumed that from the output transformers 16 and 17 there are developed two information-bearing signals on channels or circuits 10 and 11, both information-bearing signals having thereon the desired information of instantaneously the same polarity with respect to ground, and obviously in time coincidence. In accordance with the foregoing, the diode 13 will be conductive or non-conductive, depending upon which signal has the greatest instantaneous amplitude. Thus, if the signal on circuit 10 has the greater instantaneous amplitude and is of positive potential, then the diode 13 will be conductive, having a forward resistance of very low value in one embodiment of the order of 5 ohms. It will then form a low resistance connection to the diode 14 for transmittal thereto of the positive potential signal from the transmission channel 11 where it will be reproduced in the output circuit illustrated by the terminals 15. The foregoing occurs inasmuch as the resistance 12 is high-valued relative to the resistance in the forward direction of diode 13. By that is meant that the resistor 12 has a value at least a thousand times greater.

When the amplitude of the positive potential signal on channel 11 is instantaneously greater than that on channel 10, then the diode 13 is rendered non-conductive, and its high resistance of the order of 0.5 megohm (in one embodiment, 470,000 ohms) blocks from the output diode 14 signals from the channel 11. Thus there is developed at the output terminals 15 only the signals from the channel 10.

It will now be understood how noise or any other signal which instantaneously increases the amplitude of the positive potential signals on channels 10 and 11 can be eliminated, and thus the information appearing in time coincidence is always reproduced at the output terminals 15 from the signals of lesser amplitude.

The foregoing description began with a discussion of the signals as appearing on channels or circuits 10 and 11 for the reason that those skilled in the art will understand how such signals may be produced from conventional circuit elements. Thus, for example, a conventional receiver 20 connected to an antenna 21 and to ground 22 may provide excellent amplification, generally as by a superheterodyne type of receiver, the output of which is applied to a conventional push-pull detector 23. From the push-pull detector there will be obtained two signals of instantaneously the same phase which are then applied respectively to amplifiers 24 and 25. These amplifiers have their outputs connected to the primary windings of the transformers 16 and 17, from the secondary windings of which there are developed the signals above described as applied to channels 10 and 11. It is understood that the amplifiers 24 and 25 will be poled with respect to the transformer windings 16 and 17 so that there will be developed at the secondary windings and on the channels 10 and 11 output signals having the information-bearing part of the same instantaneous polarity and, as shown, both instantaneously positive.

Obviously, if both signals were to have the same polarity but both negative, then the diodes 13 and 14 would be both reversed from their illustrated positions. In this connection, it is noted that the diodes 13 and 14 have their common elements or anode terminals connected together and to the junction point 26. If both are reversed, then again their common elements or cathode terminals will be connected together and to junction point 26.

For many applications of the invention, it will be desirable to provide a system for reproducing both the positive and negative portions of the information-bearing signals, and this may be done by utilizing the system of FIG. 2. In FIG. 2 various components are identical with those of FIG. 1 and therefore have been identified with corresponding reference characters. In order to reproduce the negative portions of the information-bearing signals, the diodes 33 and 34 will both be reversed from the positions of the diodes 13 and 14. Thus, the anode terminal of diode 33 is connected to the channel 11 and the cathode terminal of diode 34 is connected to the junction of the cathode terminal of diode 33 and the resistor 35. In this manner, the signal transmission circuit including the diodes 33 and 34 and resistor 35 is operative when the signals on channels 10 and 11 are both instantaneously negative to eliminate the signal of increased amplitude and to transmit to the output 35 by way of the amplifier 36 the negative polarity signal of lesser amplitude.

From the above understanding, it is now clearly seen that the cathode terminal of diode 13 is connected to the channel 11 for operation when the signals are of instantaneously positive polarity while the anode terminal of diode 33 is connected to channel 11 for operation when the signals are of instantaneously negative polarity. It now becomes clear that the foregoing connections may be made with respect to channel 10 for additional signal transmission circuits so that the cathode terminal of a diode **13*a* may be connected to channel 10 and the anode terminal of a diode 33*a* also may be connected to channel 10. To complete the circuits for these additional signal transmission circuits, one end of a resistor 12*a* is connected to channel 11 and the other end connected to the junction of diode 13*a* and an output diode 14*a* and also in similar manner, one end of a resistor 35*a* is connected to channel 11 while the other end of that resistor is connected to the junction of diode 33*a* and an output diode 34*a*. The cathode terminals of diodes 14 and 14*a* are connected together and to the input of the isolation amplifier 37 which input is also connected by way of resistor 38 to ground. In similar manner, the anode terminals of diodes 34 and 34*a* are connected together and to the input of the isolation amplifier 36 which input is also connected by way of resistor 39 to ground. The outputs of the two isolation amplifiers 36 and 37 are connected to form one terminal of the output 35**, the other terminal being at ground potential.

In operation of the signal transmission circuits of FIG. 2, it may be assumed that the signals on channels 10 and 11 are both instantaneously of positive polarity with respect to ground and that the signal on circuit or channel 10 has a greater amplitude than the signal on channel 11. As previously described, the diode 13 will be conductive and will then provide a low resistance path to the diode 14 so that the positive potential signal on channel 11 transmitted through that diode and through amplifier 37 to the output terminal 35. In addition, since the signal on channel 10 has a greater instantaneous amplitude than that on channel 11, diode **13*a* will be nonconductive and its high resistance blocks from the diode 14*a* signals from channel 10. Thus, there is developed by way of resistor 12*a*, diode 14*a* and amplifier 37, only signals from channel 11**.

When the amplitude of the positive potential signal on channel 11 is instantaneously greater than that on channel 10, then the diode 13 is rendered nonconductive and its high resistance blocks from the output diode 14 signals from the channel 11. In addition, with the signal on channel 10 of instantaneously lesser amplitude than that on channel 11, diode **13*a* is rendered conductive and its resistance in the forward direction provides a low resistance connection to the diode 14*a*. Thus, there is transmitted by way of diodes 14 and 14*a* and amplifier 37 to the output circuits 35, only the positive potential signal on channel 10** which is the channel of lesser instantaneous amplitude.

Since it has been assumed that the information-bearing signals on channels 10 and 11 are of instantaneously positive potential, diodes 34 and **34*a* act to block any signals transmitted thereto by their associated signal transmission circuits. Thus, there is produced at the output terminal 35 only the resultant outputs of the diodes 14 and 14*a*. In this manner, the positive signals of lesser instantaneous amplitude are transmitted to the output terminals 35** with the elimination from the output circuit of positive signals of instantaneously increased amplitudes.

It will now be assumed that the signals on channels 10 and 11 are instantaneously of negative potential and thus the diodes 14 and **14*a* will block any signals produced by their associated signal transmission circuits. It will also be assumed that the signal on channel 10 has a greater instantaneous amplitude than that on channel 11 and thus the diode 33 will be conductive and its low resistance in the forward direction provides a path for transmittal to the output diode 34 of the negative potential signal from the channel 11. In addition, the diode 33*a* is rendered nonconductive and its high resistance blocks from the output diode 34*a* signals from the channel 10. Thus, there is developed at the diode 34*a* only signals from the channel 11. In this manner, there is transmitted by way of diodes 34 and 34*a* and amplifier 36 to the output circuit 35, the negative signals of channel 11**.

It will now be assumed that the negative potential signal on channel 11 is of greater instantaneous amplitude than that on channel 10, and thus the diode **33*a* is rendered conductive and it provides a low resistance connection to the diode 34*a* for transmittal thereto of the negative potential of the channel 10. In addition, diode 33 is rendered nonconductive and its high resistance blocks from the diode 34 signals from the channel 11. In this manner, there is transmitted through the diodes 34 and 34*a* and amplifier 36 to the output circuit 35 only the signal from the channel 10** which has the negative potential signal of lesser instantaneous amplitude.

In summary in FIG. 2, it will be seen that the cathode of diode 13 is connected to the channel 11 so that when that channel is of positive potential and of instantaneous increased amplitude, then diode 13 provides a substantially high resistance to flow therethrough of that signal. However, when channel 11 is of positive potential and of lesser instantaneous amplitude, then diode 13 presents a substantially lower resistance to flow therethrough of the signal from that channel. In similar manner, diode **13*a* has its cathode terminal connected to the channel 10 so that it provides a substantially high resistance to flow therethrough when the signal on channel 10 is of greater positive potential than that on channel 11 and provides a substantially low resistance to flow therethrough when the signal on channel 10 is of lesser instantaneous positive potential. When the information-bearing signals are of instantaneously negative potential, the diodes 33 and 33*a* provide a substantially high resistance when the signals on channels 11 and 10, respectively, are of increased amplitude and a substantially low resistance when the signals on channels 11 and 10**, respectively, are of lesser instantaneous negative potential. Thus, it may be concluded that the terminals of each of the several diodes are connected to an associated channel so that it provides a substantially high resistance to signals on that channel of instantaneously increased amplitude and a substantially low resistance of signals of instantaneously lesser amplitude.

It is also to be noted that the series resistor and diode in each of the signal transmission circuits may be selected to have predetermined resistance values in order to produce an output which is proportional to the varying information-bearing signals. For example, the resistor 12 may have a value so that the proportion of that value with respect to the resistance in the reverse direction of the diode 13 is equal to the proportion of the resistance in the forward direction with respect to the value of that resistor. In one embodiment of the invention, the resistor 12 may have a value of 1500 ohms and the resistance in the forward direction of the diode may be in the order of 5 ohms while the resistance in the reverse direction may be approximately 470,000 ohms. Thus, the impedance proportion in this embodiment would then approximate $$\frac{1500}{470{,}000}=\frac{5}{1{,}500}$$

What is claimed is:

1. In combination, means to receive intelligence bearing electrical energy, means to separate said electrical energy into two information-bearing signals in which the information is contained by said signals in time coincidence and where the instantaneous amplitude of only one of said signals has been increased by random undesirable noise, at least one signal transmission circuit having in series circuit relation a resistor and a first diode having a resistance in the forward direction a small fraction of its resistance in the reverse direction, an output circuit connected to the junction of said resistor and said first diode and including therein a second diode a terminal of which is connected to a comparable terminal of said first diode, and means for applying a first of said two signals to the end of said resistor remote from said junction and a second of said two signals to the other terminal of said first diode for selective transmittal to said second diode of the signal of lesser instantaneous amplitude for elimination from said output circuit of said signal of instantaneously increased amplitude.

2. The receiver of claim 1 in which the terminals of said first diode are connected to provide a substantially high resistance to the flow therethrough of said second signal when said second signal is of instantaneously increased amplitude and to provide a substantially low resistance to flow therethrough of said second signal when said second signal is of lesser instantaneous amplitude.

References Cited by the Examiner

UNITED STATES PATENTS

| | | | |
|---|---|---|---|
| 2,725,467 | 11/1955 | Atwood | 325—304 |
| 2,903,577 | 9/1959 | Adams | 325—305 |
| 2,946,010 | 7/1960 | Tarczy-Hornoch | 328—116 |
| 2,968,718 | 1/1961 | McKesson | 325—366 |
| 3,046,415 | 7/1962 | Winslow | 307—88.5 |
| 3,048,712 | 8/1962 | Alm | 307—88.5 |

DAVID G. REDINBAUGH, *Primary Examiner*

JOHN W. HUCKERT, *Examiner.*